W. G. TRAUTVETTER.
LOOM.
APPLICATION FILED JUNE 26, 1915.

1,184,790.

Patented May 30, 1916.
15 SHEETS—SHEET 1.

WITNESSES

INVENTOR
William George Trautvetter
BY
ATTORNEYS

W. G. TRAUTVETTER.
LOOM.
APPLICATION FILED JUNE 26, 1915.

1,184,790.

Patented May 30, 1916.
15 SHEETS—SHEET 2.

WITNESSES

INVENTOR
William George Trautvetter

BY

ATTORNEYS

W. G. TRAUTVETTER.
LOOM.
APPLICATION FILED JUNE 26, 1915.

1,184,790.

Patented May 30, 1916.
15 SHEETS—SHEET 5.

WITNESSES

INVENTOR
William George Trautvetter
BY
ATTORNEYS

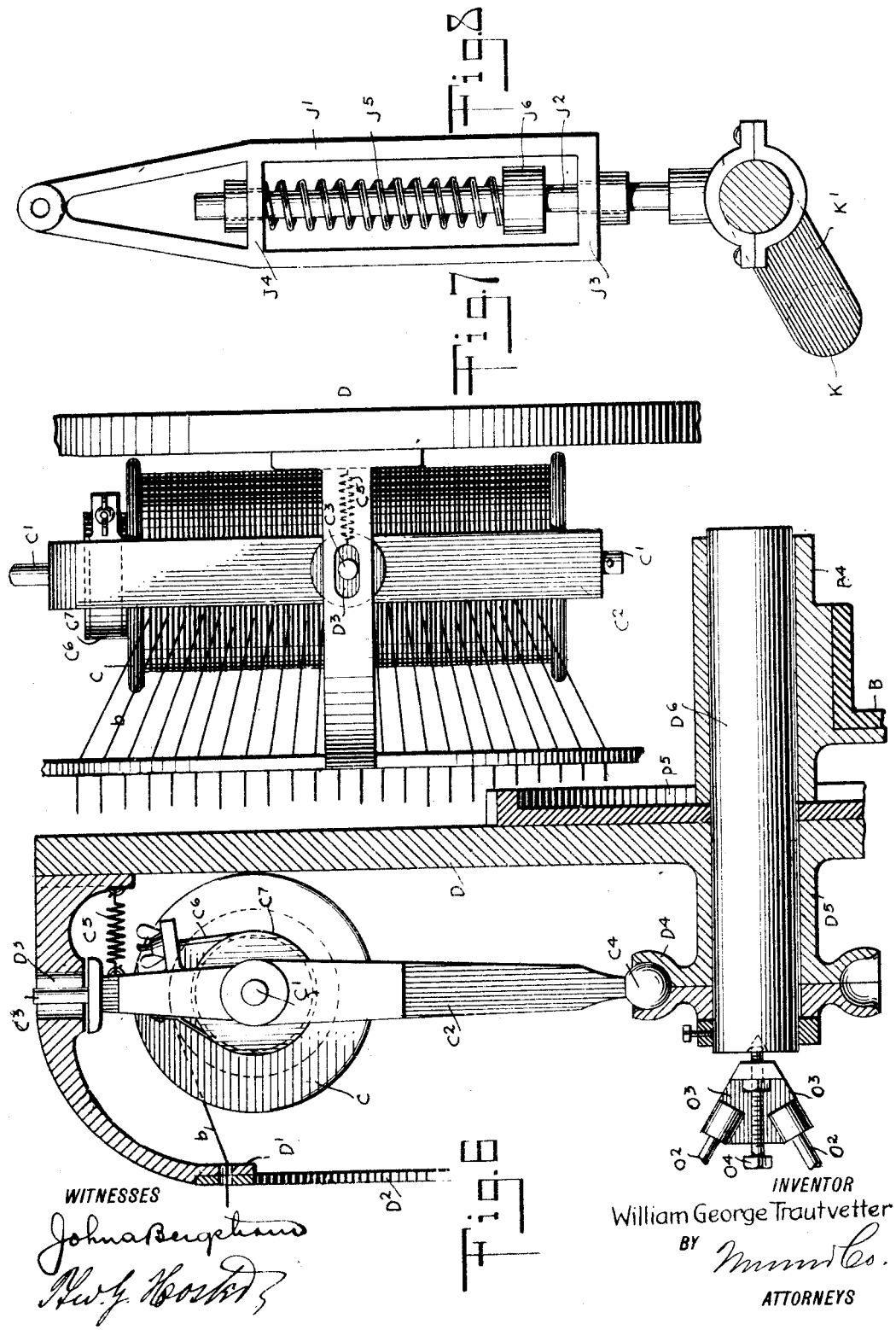

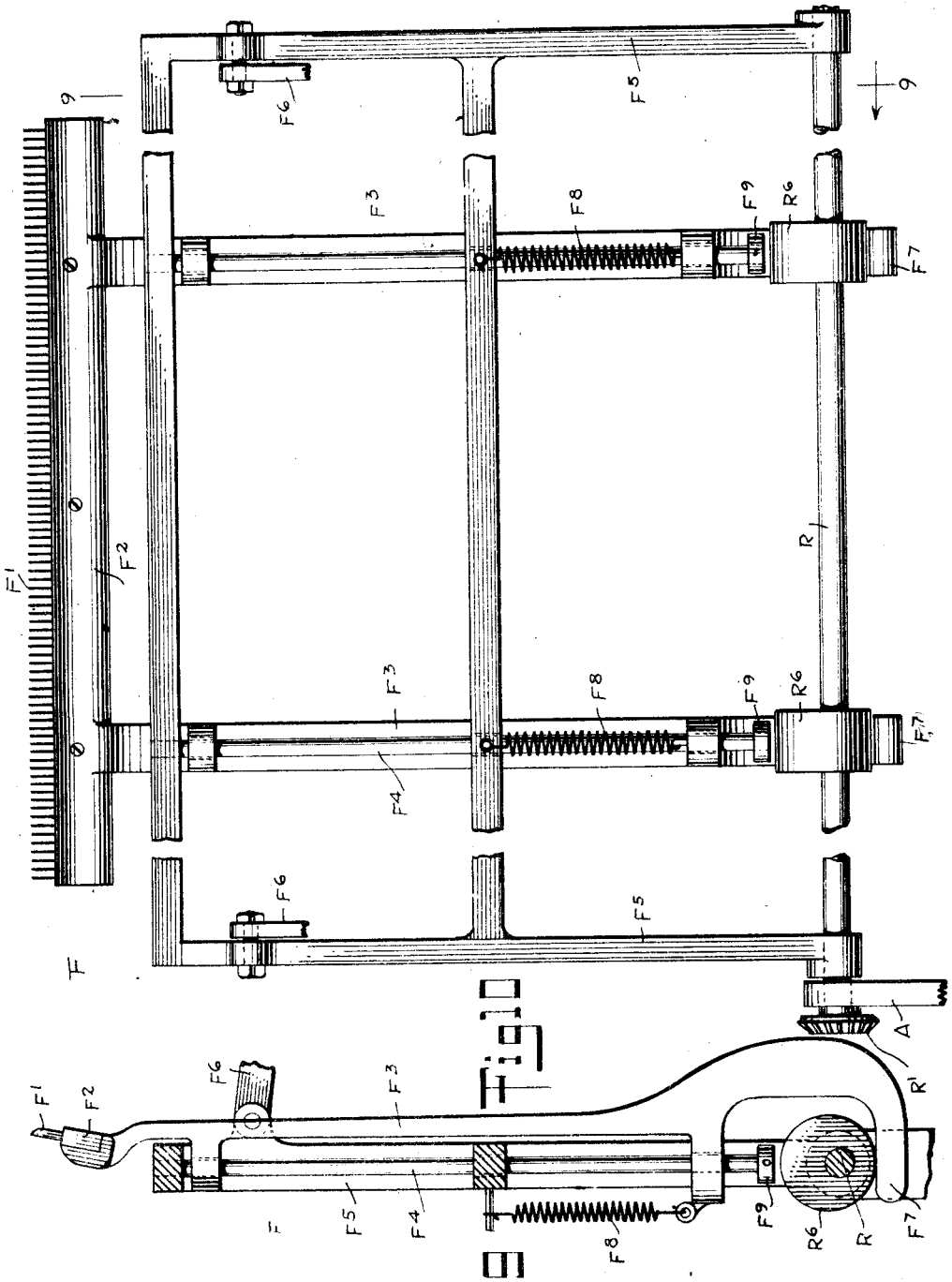

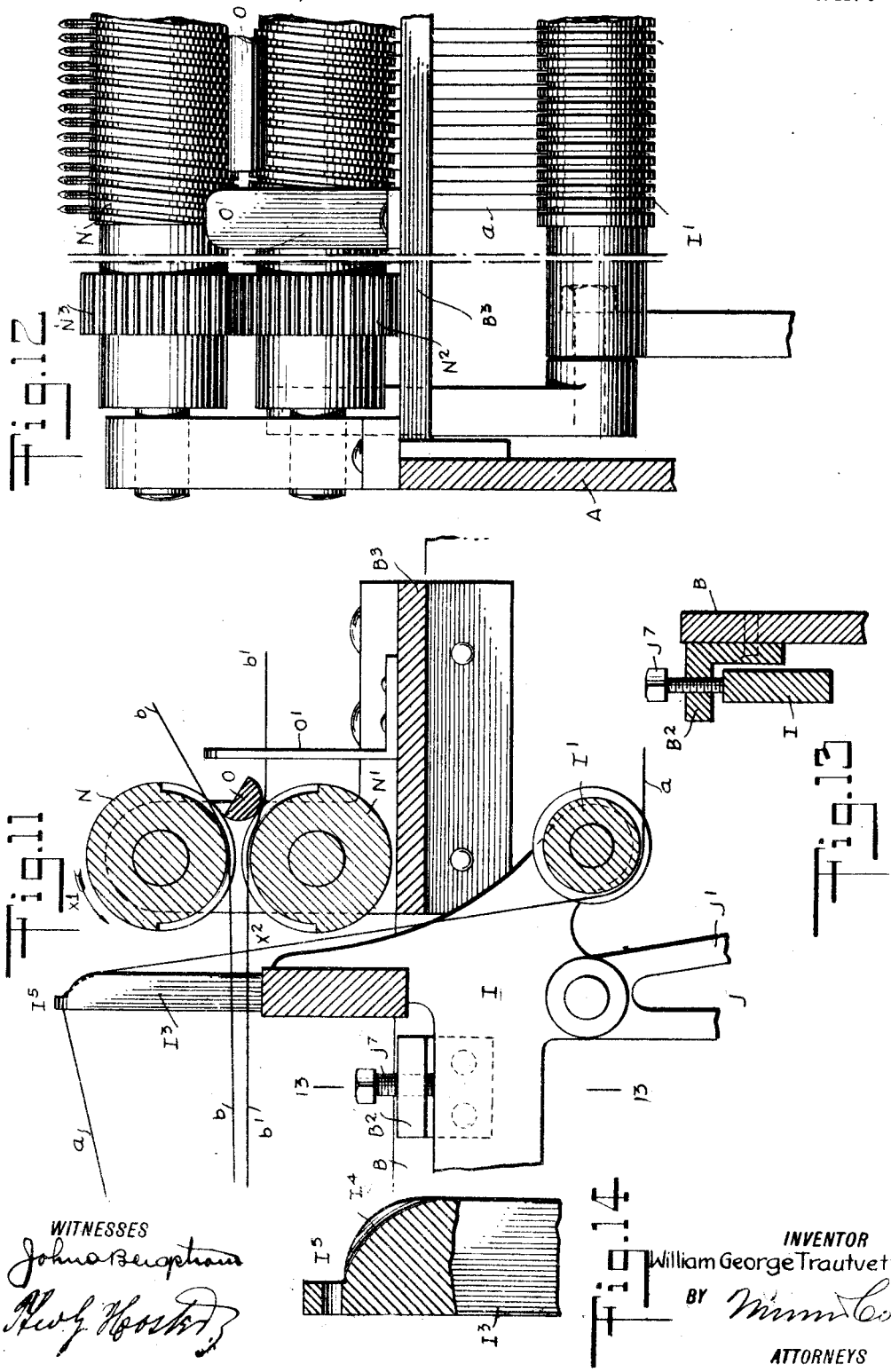

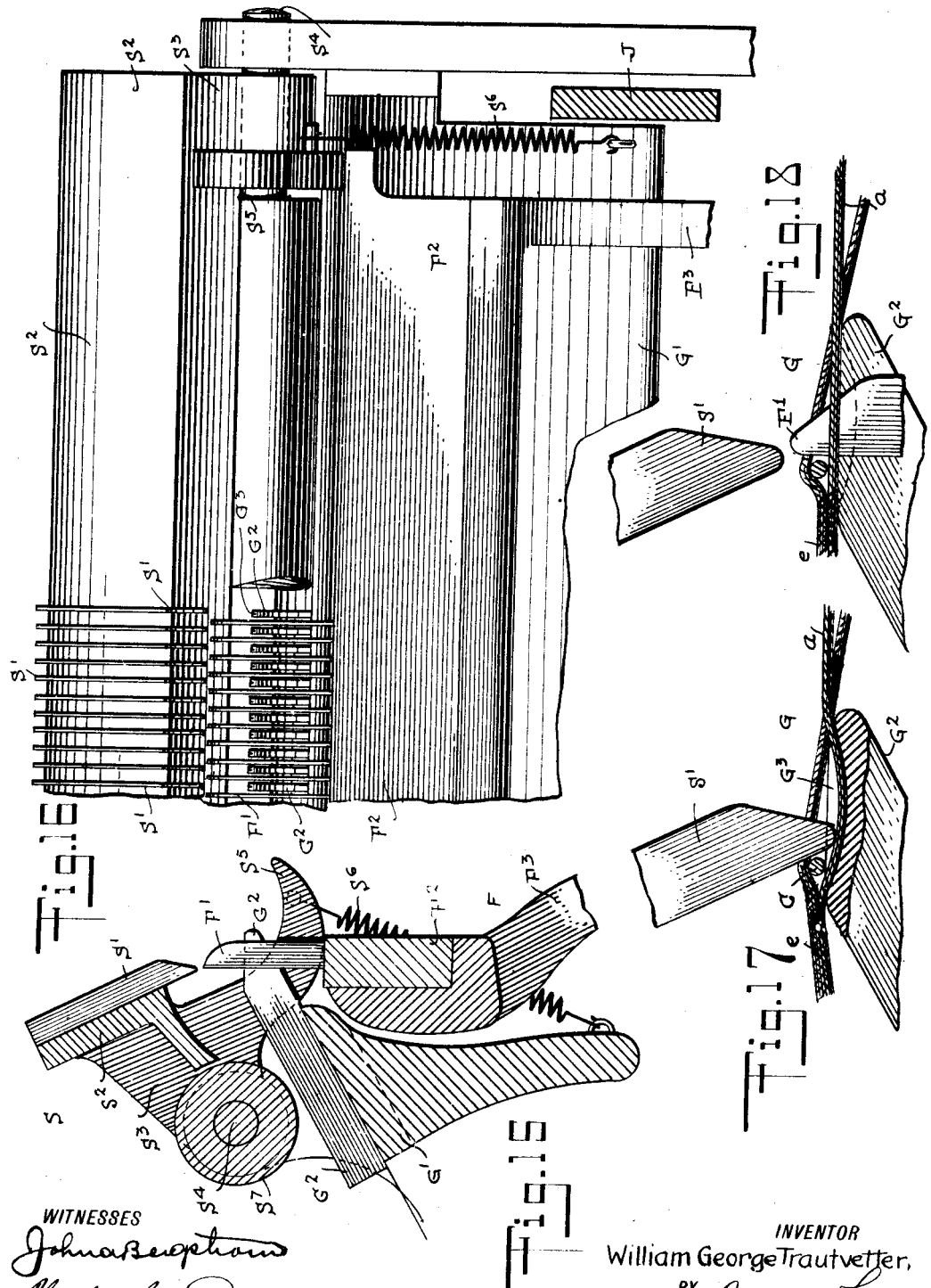

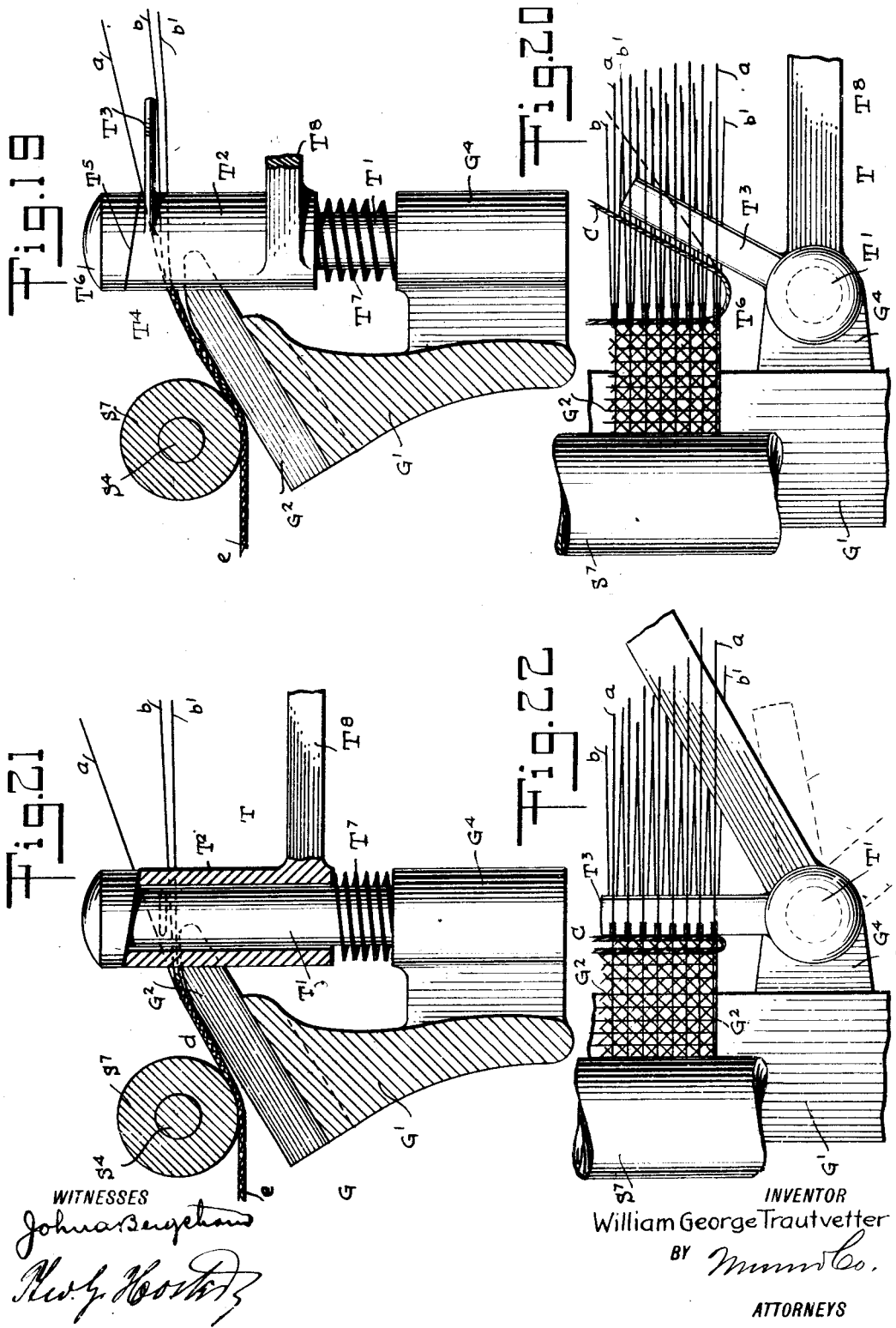

W. G. TRAUTVETTER.
LOOM.
APPLICATION FILED JUNE 26, 1915.

1,184,790. Patented May 30, 1916.
15 SHEETS—SHEET 11.

WITNESSES

INVENTOR
William George Trautvetter
BY
ATTORNEYS

W. G. TRAUTVETTER.
LOOM.
APPLICATION FILED JUNE 26, 1915.

1,184,790.

Patented May 30, 1916.
15 SHEETS—SHEET 13.

WITNESSES
John A. Bergstrom
Rud. J. Koster

INVENTOR
William George Trautvetter
BY Munn & Co.
ATTORNEYS

W. G. TRAUTVETTER.
LOOM.
APPLICATION FILED JUNE 26, 1915.

1,184,790.

Patented May 30, 1916.
15 SHEETS—SHEET 15.

WITNESSES

INVENTOR
William George Trautvetter
BY
ATTORNEYS

UNITED STATES PATENT OFFICE.

WILLIAM GEORGE TRAUTVETTER, OF PATERSON, NEW JERSEY.

LOOM.

1,184,790.

Specification of Letters Patent.

Patented May 30, 1916.

Substitute for application Serial No. 799,991, filed November 8, 1913. This application filed June 26, 1915.
Serial No. 36,416.

*To all whom it may concern:*

Be it known that I, WILLIAM GEORGE TRAUTVETTER, a citizen of the United States, and a resident of Paterson, in the county of Passaic and State of New Jersey, have invented a new and Improved Loom, of which the following is a full, clear, and exact description, this being a substitute application for the one filed December 27, 1910, No. 599,270, renewed on March 8, 1913, and November 8, 1913, Serial Nos. 753,140 and 799,991, respectively.

The object of the invention is to provide a new and improved loom, more especially designed for weaving a flat fabric, having interwoven bias or diagonal reinforcing threads, such, for instance, as shown and described in my Patent, No. 1,033,843, and dated July 30, 1912.

For the purpose mentioned, use is made of an interweaving means for interweaving the warp threads, weft threads and reinforcing threads, and shifting means for guiding and shifting the reinforcing threads in a transverse direction in the rear of the interweaving means.

A practical embodiment of the invention is represented in the accompanying drawings forming a part of this specification, in which similar characters of reference indicate corresponding parts in all the views.

Figure 1:
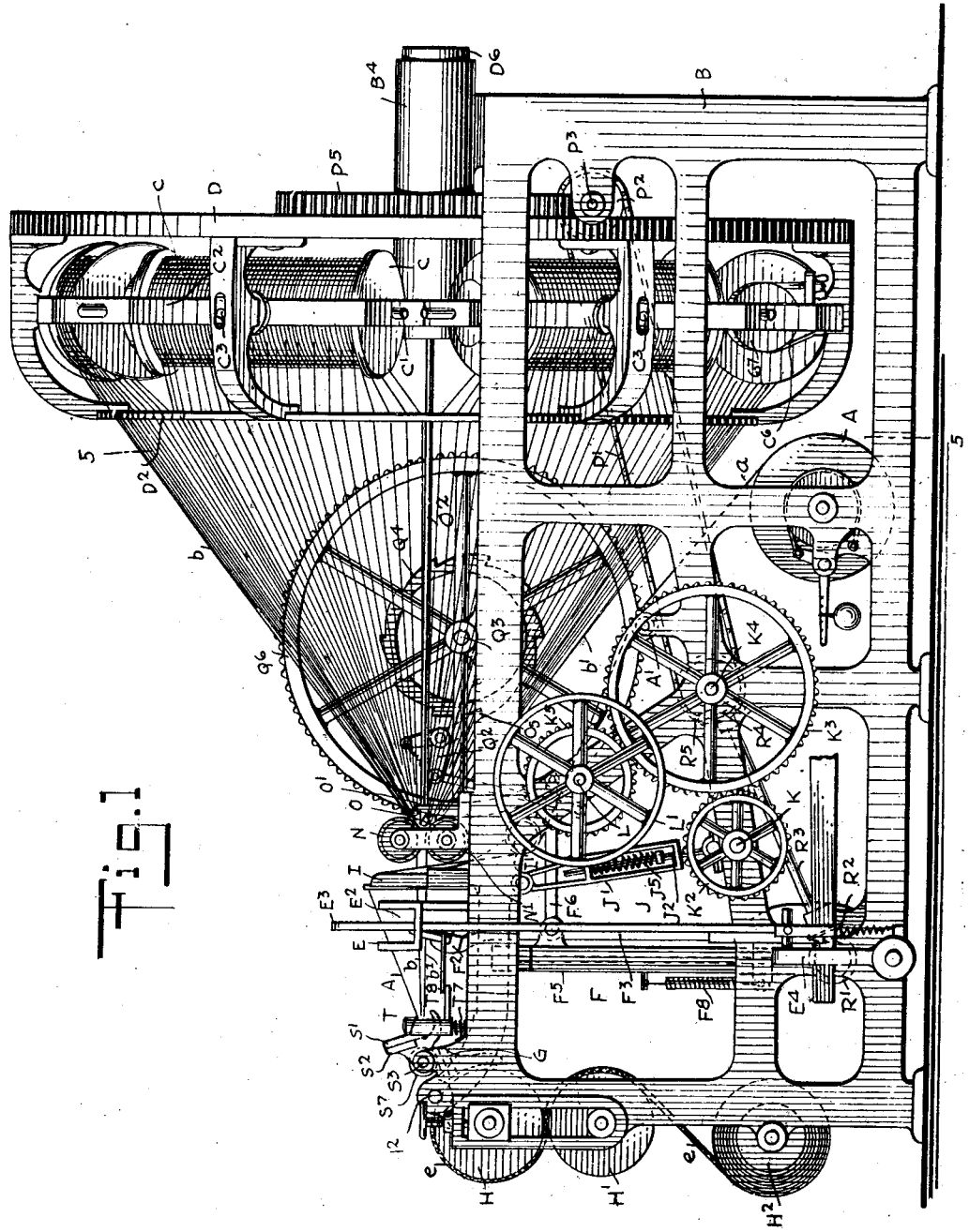
Figure 2:
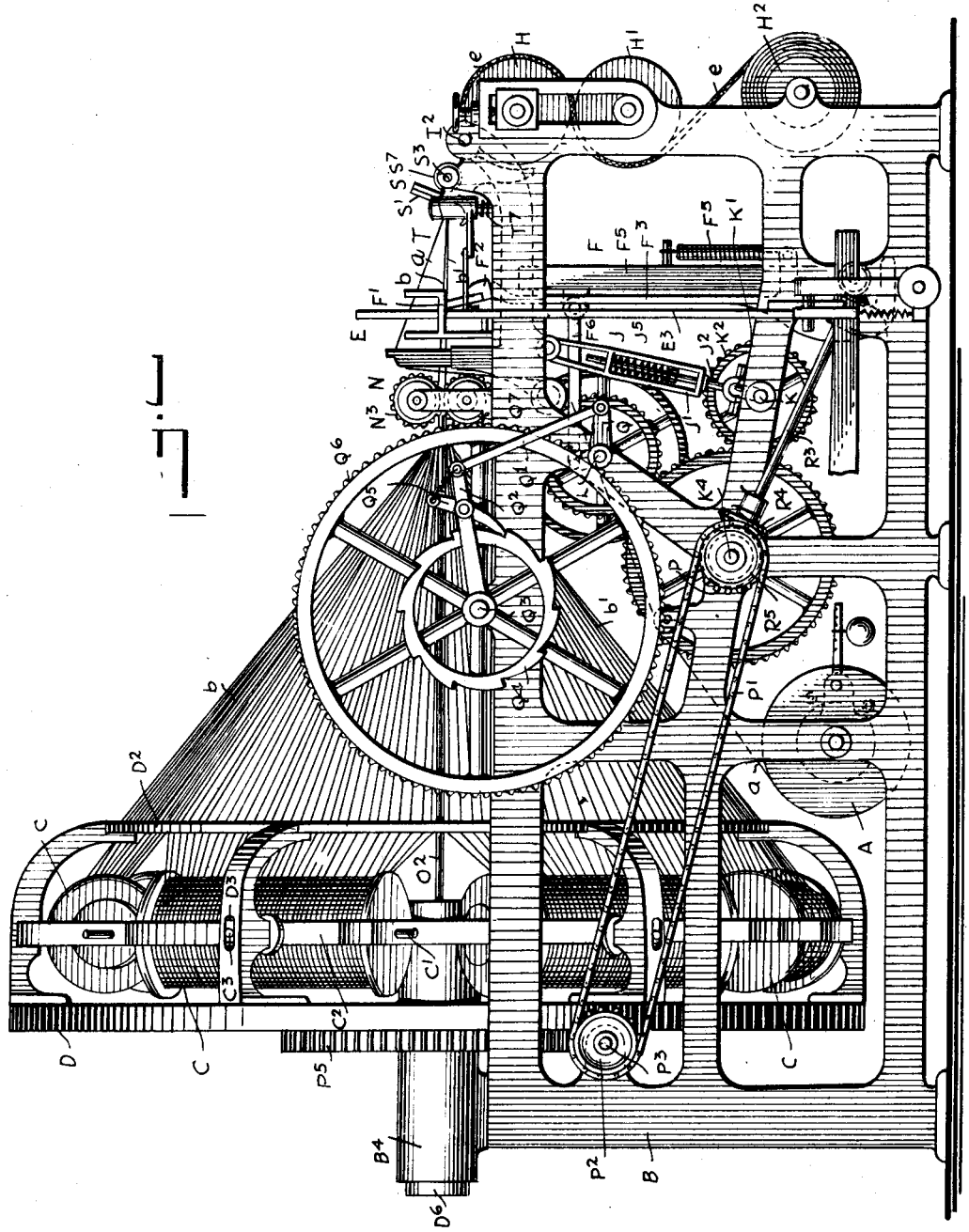
Figure 3:
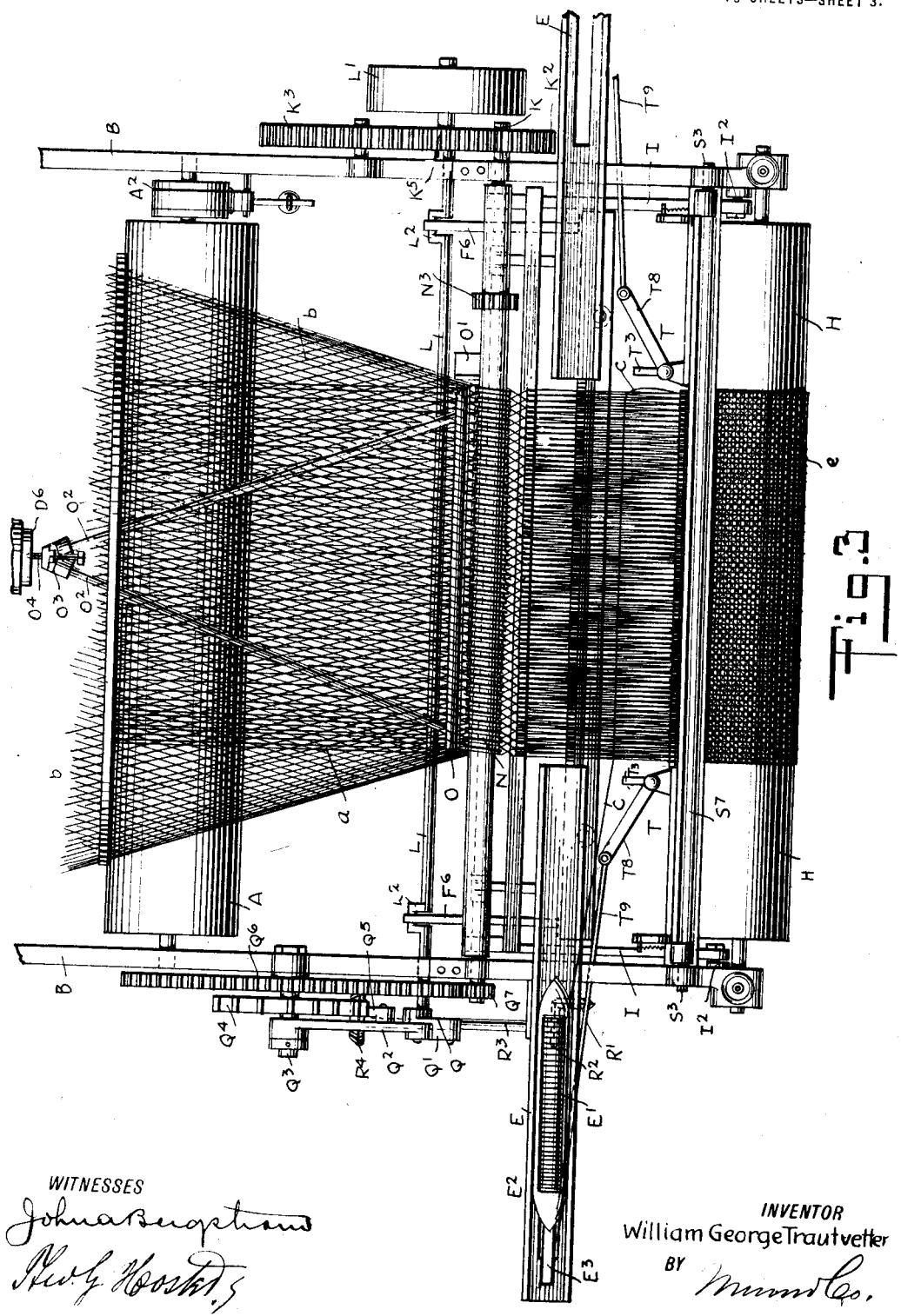
Figure 4:
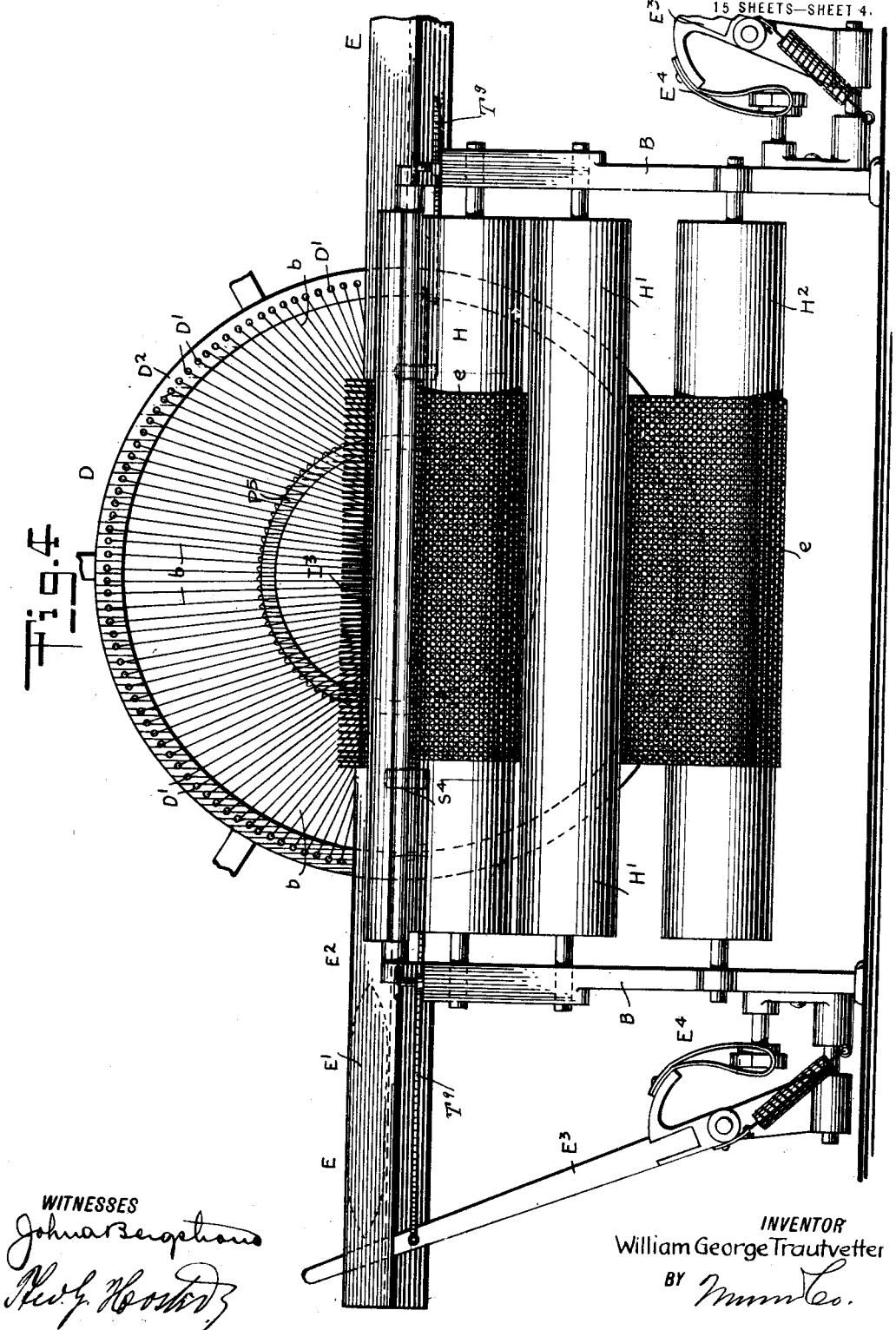
Figure 5:
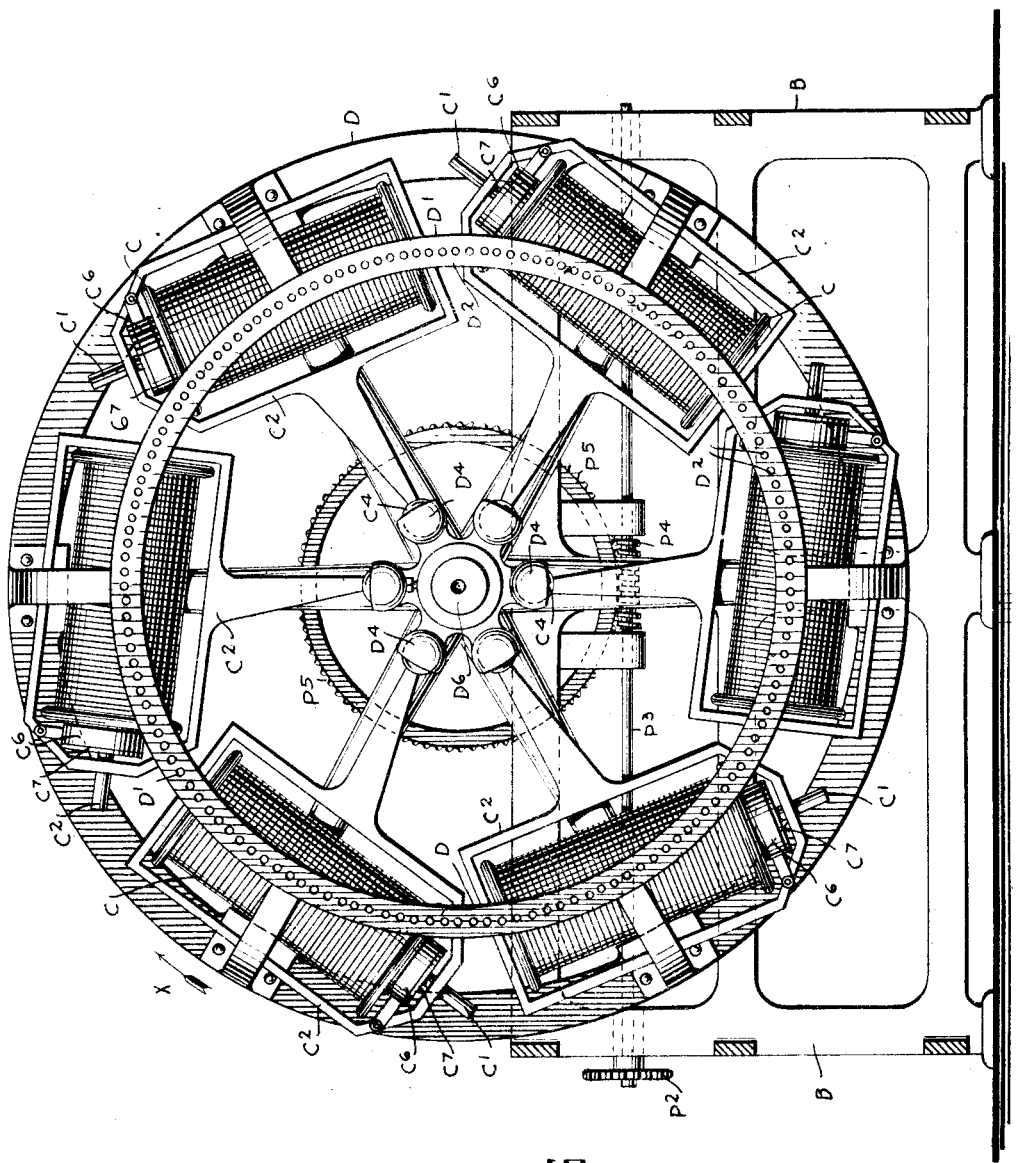
Figure 23:
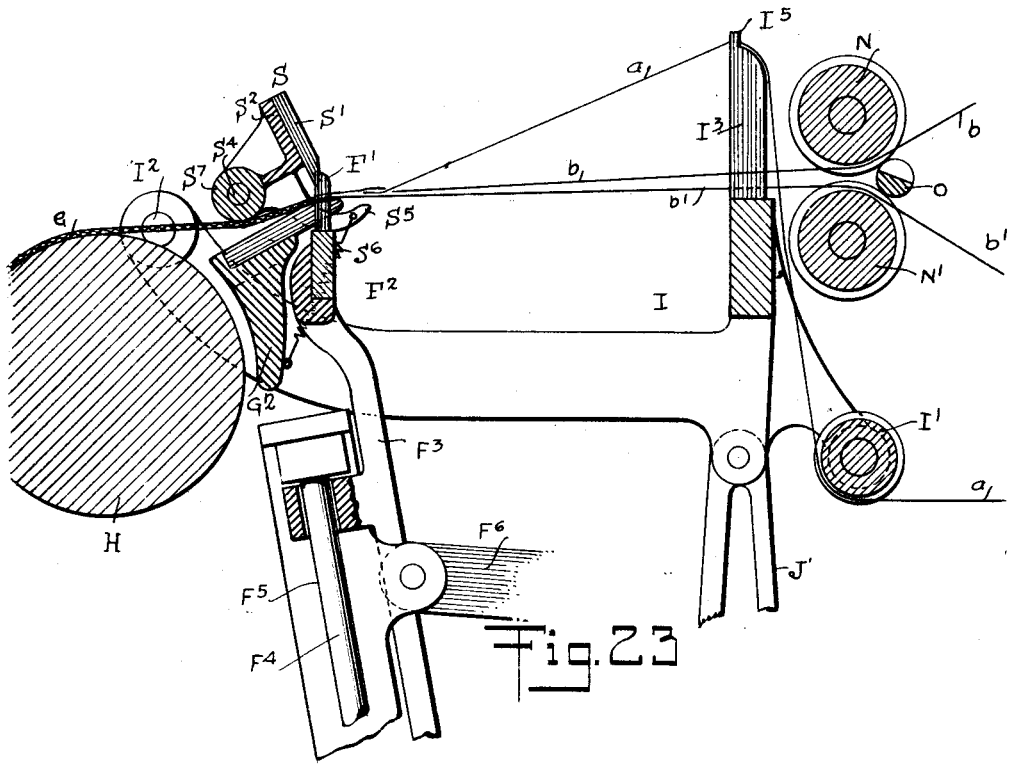
Figure 24:
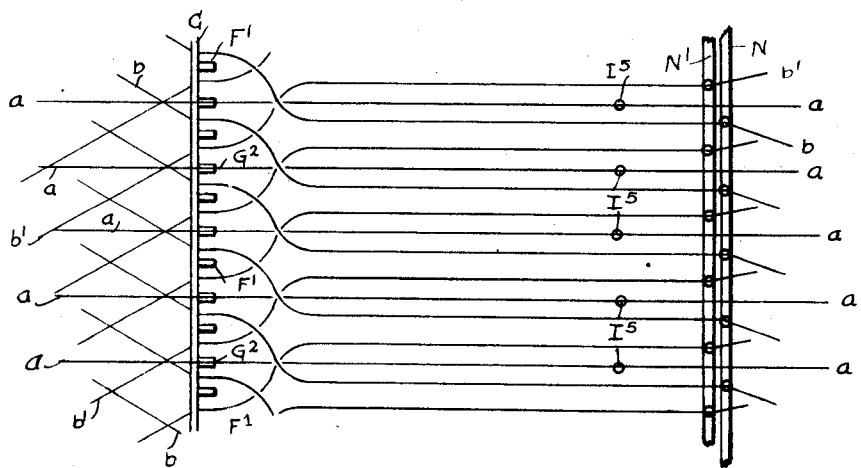
Figure 30:
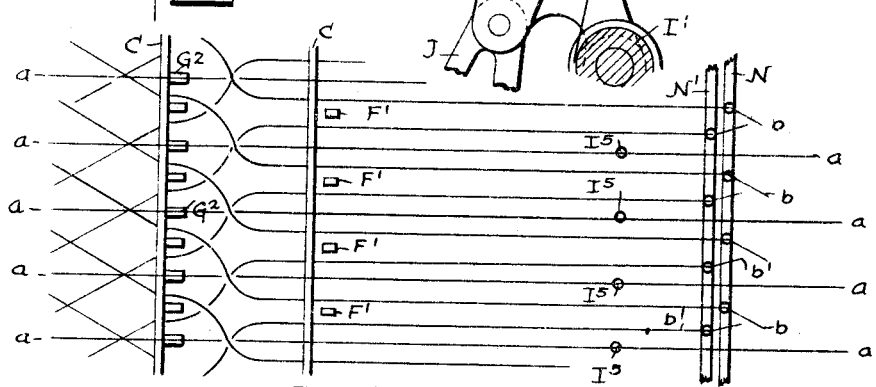
Figure 31:
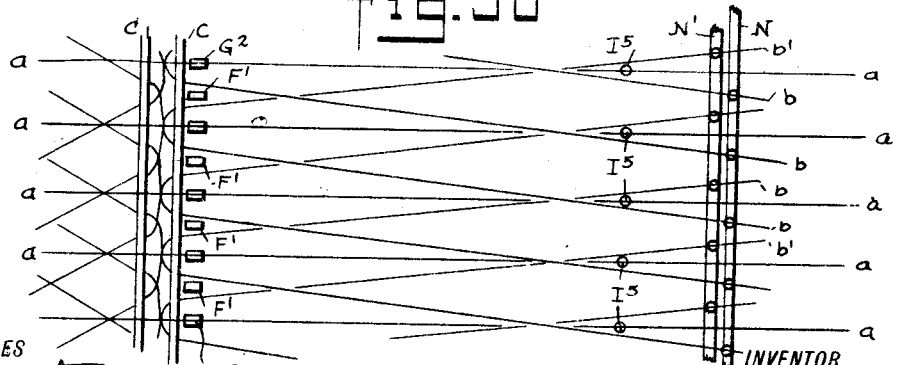
Figure 32:
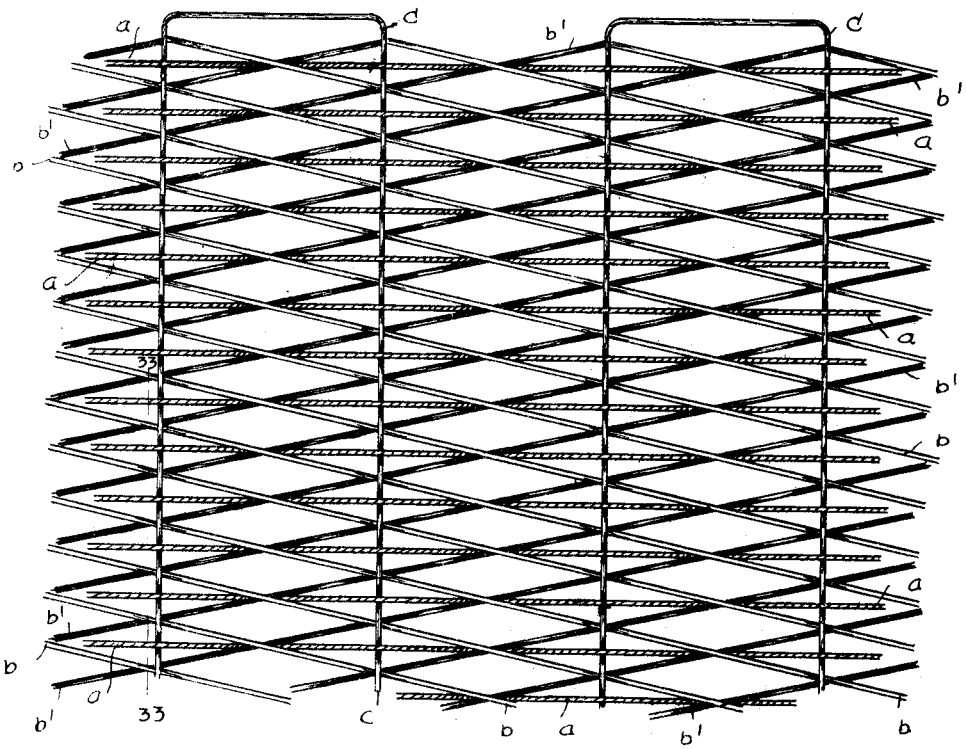
Figures 33, 35:
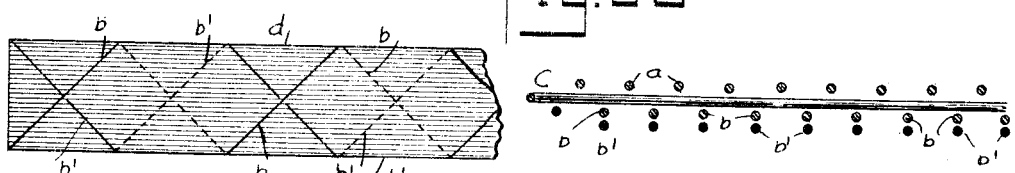
Figure 34:
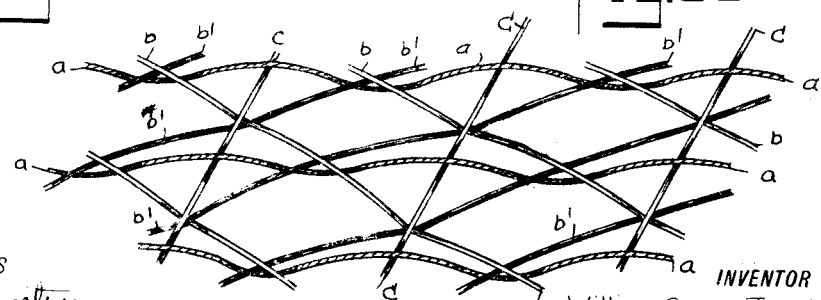

Figure 1 is an elevation of the right-hand side of the loom; Fig. 2 is a similar view of the left-hand side of the loom; Fig. 3 is a plan view of the forward portion of the loom; Fig. 4 is a front elevation of the loom; Fig. 5 is a cross section of the same on the line 5—5 of Fig. 1, and showing more particularly the revoluble spool holder for the reinforcing or bias threads; Fig. 6 is an enlarged sectional side elevation of part of the revoluble spool holder; Fig. 7 is a plan view of the same; Fig. 8 is an enlarged side elevation of the means for imparting an up and down swinging motion to the needle frame; Fig. 9 is an enlarged sectional side elevation of the lay, the section being on the line 9—9 of Fig. 10; Fig. 10 is a front elevation of the same; Fig. 11 is an enlarged sectional side elevation of the needle frame and the shifting mechanism for the diagonal threads; Fig. 12 is a rear elevation of the same and showing the loom frame in section; Fig. 13 is a cross section of the adjustable stop for limiting the upward movement of the needle frame, the section being on the line 13—13 of Fig. 11; Fig. 14 is an enlarged sectional side elevation of one of the needles; Fig. 15 is an enlarged sectional side elevation of the clamping device for clamping the threads in position in the rear of the woven fabric; Fig. 16 is a rear elevation of the same; Fig. 17 is an enlarged sectional side elevation of part of the clamping device and showing the parts in position for clamping the threads; Fig. 18 is a like view of the same showing the parts in released position; Fig. 19 is an enlarged sectional side elevation of the mechanism for opening the shed at the sides adjacent to the fabric; Fig. 20 is a plan view of the same; Fig. 21 is a sectional side elevation of the same showing the parts in a different position; Fig. 22 is a plan view of the same; Fig. 23 is an enlarged sectional side elevation of a part of the loom; Fig. 24 is a diagrammatic plan view of the same; Figs. 25 to 29 are sectional side elevations of the loom, showing the parts in successive positions for forming the fabric; Figs. 30 and 31 are diagrammatic plan views of the same; Fig. 32 is an enlarged plan view of the fabric; Fig. 33 is a cross section of the same on the line 33—33 of Fig. 32; Fig. 34 is an enlarged perspective view of the fabric; and Fig. 35 is a diagrammatic plan view of the fabric.

The woven fabric illustrated in Figs. 32, 33, 34 and 35, consists essentially of regular or ground warp threads $a$, bias or diagonal reinforcing threads $b$, $b'$ arranged in sets, and weft threads $c$. The ground warp threads $a$ are arranged lengthwise of the fabric parallel one to the other, and the sets of reinforcing threads $b$, $b'$ extend diagonally across the fabric in opposite directions from one selvage $d$ to the other selvage $d'$, and return, so that the bias reinforcing threads $b$, $b'$, cross each other between the adjacent picks and at the top of the ground warp threads $a$, which latter pass over the weft threads $c$, while the bias reinforcing threads $b$, $b'$ pass under the said weft threads $c$, as plainly indicated in Figs. 32, 33 and 34. It will also be noticed that the bias reinforcing threads $b$, $b'$ cross each other under the weft threads $c$, so that the ground warp threads, bias reinforcing threads and weft threads are compactly interwoven with each other to form a reinforced and exceedingly strong and durable fabric, capable of withstanding strains in any direction.

The warp threads $a$ unwind from a warp beam A of the usual construction, and journaled in the lower rear portion of the main frame B of the loom, the diagonal threads $b$, $b'$ unwind from spools C journaled in a revoluble spool holder or reel D mounted in the rear of the main frame B, and the weft threads $c$ are supplied by a suitable shuttle mechanism E and are beaten up by a lay F against the fabric $e$ at the breast beam G from which the fabric passes over rollers H, H' onto the cloth beam $H^2$ journaled on the front of the main frame B. The warp threads $a$ after unwinding from the warp beam A pass upwardly and forwardly over a grooved guide roller A' journaled in the main frame B, and then the warp threads $a$ pass under a guide roller I' journaled on a needle frame I fulcrumed at $I^2$ on the front end of the main frame B, and the said needle frame I is provided with upwardly extending spaced needles $I^3$ each having a groove $I^4$ (see Figs. 11 and 14), and an eye $I^5$ for the passage of a warp thread extending upwardly from the guide roller I'. The needle frame I is pivotally connected by a sectional link J with the crank arm K' of a crank shaft K journaled on the main frame B and provided with a gear wheel $K^2$ in mesh with a gear wheel $K^3$ secured on a shaft $K^4$ likewise journaled in the main frame B. The gear wheel $K^3$ is also in mesh with a gear wheel $K^5$ secured on the main or crank shaft L journaled on the main frame B and provided with a pulley L' connected by belt with other machinery for imparting a rotary motion to the shaft L. Thus when the loom is running a rotary motion is transmitted to the shaft K from the shaft L by the gearing described so that an up and down swinging motion is given to the needle frame I by the sectional link J. The sectional link J, shown in Figs. 1 and 8, consists of members J' and $J^2$, of which the member J' is pivotally connected with the needle frame I and in it is mounted to slide the other member $J^2$ pivotally connected with the crank arm K'. The member $J^2$ is in the form of a rod mounted to slide in bearings $J^3$, $J^4$ formed on the member J', and on the member $J^2$ is coiled a spring $J^5$ resting with one end on the bearing $J^4$ and pressing with its other end against a collar $J^6$ held on the member $J^2$. The collar $J^6$ is normally spaced from the bearing $J^3$. When the loom is running the sectional link J imparts an intermittent swinging motion to the needle frame I, that is, the needle frame is held at rest for a short time when reaching an uppermost position, the needle frame being for this purpose adapted to abut against an adjustable stop $J^7$ (see Figs. 11 and 13) screwing in a bracket $B^2$ attached to the main frame B. The needle frame I abuts against the adjustable stop $J^7$ previous to the crank arm K' reaching an uppermost vertical position so that the member $J^3$ is caused to slide in the member J' and the spring $J^5$ is compressed, and when the crank arm K' begins its downward swinging movement the member $J^2$ slides back in the member J' until the collar $J^6$ abuts against the bearing $J^3$, after which the entire link J is drawn downward to impart a downward swinging motion to the needle frame I which by the use of the sectional link J is held at rest in an uppermost position during a portion of each revolution of the crank arm K'.

The spools C are arranged in a circle on the revoluble reel D, and the diagonal upper and lower threads $b$, $b'$ shortly after unwinding from the said spool C pass through eyes D' formed in a ring $D^2$ fixed on the front of the revoluble reel D and forming part thereof, and the threads $b$ in the upper half portion of the ring $D^2$ extend forwardly and engage the under side of a spiral or screw-threaded roller N, while the threads $b'$ in the lower half portion of the ring $D^2$ extend forwardly and after passing under a guide rod O engage the top of a spiral or screw-threaded roller N' arranged below the roller N, the said rollers N and N' being journaled in suitable bearings on the main frame B.

Each of the diagonal threads $b$, $b'$ engages a groove in the corresponding roller N or N', it being understood that the rollers N and N' have a number of convolutions aggregating the number of upper and lower threads $b$, $b'$. As an example, it may be stated, that for a fabric say of 12 inches wide with 6 threads to the inch, it will require 72 upper threads $b$ and 72 lower threads $b'$ which unwind from six spools of 24 threads each. Each of the rollers N, N' is provided with 72 convolutions, thus accommodating the 144 diagonal threads $b$ and $b'$.

When the loom is running the upper diagonal threads $b$ are guided by the roller N from the left to the right while the lower diagonal threads $b'$ are guided by the lower roller N' from the right to the left, it being expressly understood that the upper diagonal threads $b$ are those in the upper half portion of the ring $D^2$ and engage the roller N, while the lower diagonal threads $b'$ are those in the lower half portion of the ring $D^2$ and engage the roller N'. A diagonal thread $b$ on reaching the last convolution of the roller N at the right-hand end thereof now also reaches the beginning of the lower half of the ring D², and this thread $b$ now passes from the roller down into engagement with the right-hand end of the lower roller N' and thus becomes a lower thread $b'$ which is guided by the lower roller N' from the right to the left, and during the time the thread $b'$ is in the lower half portion of the ring D² of the revoluble reel D. When a thread $b'$ reaches the left-hand end of the lower roller N' it also starts on the upper half portion of the ring D² and now leaves the lower roller N' and passes upward to the left or beginning end of the upper roller N to become an upper thread $b$ and be again guided by the roller N from the left to the right. Thus each diagonal thread is guided by the roller N from the left to the right and then by the roller N' from the right to the left and passed back to the beginning or left-hand end of the roller N. The rollers N and N' are intermittently rotated from the main shaft L in such a manner that for every revolution of the main shaft L one revolution is given to each roller, and the revoluble reel D is turned from the shaft K⁴ in such a manner that one revolution of the crank shaft L gives 144th part of a revolution to the revoluble reel D under the assumption that 144 diagonal threads $b$, $b'$ are used at the time.

In order to properly guide the thread $b$ from the right-hand end of the upper roller N to the corresponding end of the lower roller N', use is made of a guide arm O' secured to a cross bar B³ forming part of the main frame B (see Figs. 11 and 12). It is understood that the guide bar C extends the length of the threads on the rollers N and N' so that the end threads $b$ and $b'$ can readily pass from the roller N to the roller N' at the right-hand side of the said rollers, and from the roller N' to the roller N at the left-hand side of the rollers.

Each of the spools C has its spindle C' journaled in a spool frame C² having journals C³, C⁴ disposed radially on the revoluble reel D, the journal C³ engaging an elongated slot D³ formed in the rim of the reel D, while the journal C⁴ is in the form of a ball engaging a correspondingly shaped socket D⁴ forming part of the hub D⁵ of the reel D, the said hub D⁵ being secured on a shaft D⁶ rotating in a bearing B⁴ forming part of the main frame B. A spring C⁵ attached at one end to the revoluble reel D connects at its upper end to the upper portion of the spool frame C² so as to keep the threads $b$, $b'$ under tension, and each spool C is engaged by a tension mechanism, preferably in the form of a brake band C⁶ attached to the frame C² and engaging a brake pulley C⁷ attached to the spool C. By the tension mechanism the threads $b$ and $b'$ are prevented from unwinding too fast from the spool C.

The guide rod O previously mentioned rests on the top of the lower diagonal threads $b'$ and is supported from the forward end of the shaft D⁶, and for this purpose the guide rod O is provided with rearwardly extending supporting rods O² attached at their rear ends to a plate O³ carrying a screw O⁴ having a pointed end engaging the center of the shaft D⁶ to support the rear ends of the said rods from the shaft D⁶, as will be readily understood by reference to Figs. 3 and 6.

In order to rotate the reel D from the driven shaft K⁴ previously mentioned, the following arrangement is made: On the shaft K⁴ is secured a sprocket wheel P connected by a sprocket chain P' with a sprocket wheel P² secured on a transversely extending shaft P³ journaled in suitable bearings on the rear end of the main frame B, and on the said shaft P³ is secured a worm P⁴ (see Fig. 5) in mesh with a worm wheel P⁵ secured on the shaft D⁶ of the revoluble reel D. Now when the loom is running a comparatively slow but continuous rotary motion is given to the reel D to rotate the same in the direction of the arrow $x$.

The rollers N, N' are intermittently rotated in the direction of the arrows $x'$, $x^2$ (see Fig. 11), it being understood that the threads of the rollers are both left-hand threads, as indicated in Fig. 12. The rollers N and N' are intermittently rotated from the main shaft L and for this purpose the following arrangement is made: On the main shaft L at the left-hand side of the loom is secured a crank arm Q (see Fig. 2) connected by a link Q' with a lever Q² mounted to swing loosely on the shaft Q³ journaled on the main frame B. On the shaft Q³ is secured a ratchet wheel Q⁴ engaged by a spring-pressed pawl Q⁵ fulcrumed on the arm Q², so that when the loom is running and the main shaft L is rotated then an intermittent rotary motion is given to the shaft Q³ by the mechanism just described. On the shaft Q³ is secured a large gear wheel Q⁶ in mesh with a pinion Q⁷ secured on the lower roller N' connected by gear wheels N², N³ with the upper roller N so that the rollers N and N' are rotated intermittently but in unison by the intermittently rotating gear wheel Q⁶ turning the pinion Q⁷.

The shuttle mechanism E is provided with the usual shuttle E' caused to travel in a shuttle race E² by the action of picker sticks E³, actuated by a mechanism E⁴ from the main shaft L, but as the said mechanism E⁴ is of the usual construction it is not deemed necessary to further describe the same in detail.

The lay F is arranged to swing forward, then to move downward and backward in this lowermost position to then raise to uppermost position prior to the next forward swinging movement. For the purpose mentioned the lay is constructed as follows: The lay F is provided with dents F' extending upwardly from a cross bar $F^2$ having depending arms $F^3$ mounted to slide on guide rods $F^4$ attached to and forming part of a frame $F^5$ mounted to swing loosely on the transverse shaft R journaled in suitable bearings arranged on the forward lower end of the main frame B. The frame $F^5$ is connected by pitmen $F^6$ with the crank arms $L^2$ on the main shaft L (see Fig. 3), so that when the loom is running a forward and backward swinging motion is given to the frame $F^5$, and as the arm $F^3$ carrying the dent bar $F^2$ is mounted on the guide rods $F^4$, it is evident that a like forward and backward swinging motion is given to the said dent bar $F^2$ and its dents F'. The shaft R is driven from the shaft $K^4$, and for this purpose the shaft R is provided with a bevel gear wheel R' in mesh with a bevel gear wheel $R^2$ secured on a shaft $R^3$, journaled in suitable bearings on the left-hand side of the main frame B, and on the said shaft $R^3$ is secured a bevel gear wheel $R^4$ in mesh with a bevel gear wheel $R^5$ secured on the driven shaft $K^4$ previously mentioned, so that when the loom is running a continuous rotary motion is given to the shaft R from the shaft $K^4$ by the gearing just described. On the shaft R (see Figs. 9 and 10) are secured eccentric cams $R^6$ engaging foot-pieces $F^7$ formed on the arms $F^3$, so as to impart a downward sliding motion to the said arms $F^3$ carrying the dent bar $F^2$. Springs $F^8$ are attached at the lower end to the arms $F^3$ and at the upper end to the frame $F^5$ so as to hold the foot-pieces $F^7$ in contact with the peripheral faces of the cams $R^6$ to cause a return or upward movement of the arms $F^3$ and the dent bar $F^2$. The lower ends of the guide rods $F^4$ are provided with collars $F^9$ extending a short distance above the peripheral faces of the cams $R^6$, so that in case the springs $F^8$ should break the arms $F^3$ are limited in their downward movement to prevent damage to the adjacent parts of the lay. Now when the loom is running a forward and backward swinging motion is given to the lay from the crank arms $L^2$ of the main shaft L by the use of the pitmen $F^6$ and the swing frame $F^5$, and a downward sliding movement is given to the arms $F^3$ carrying the dent bar $F^2$ immediately after the lay has reached the end of its forward stroke by the use of the cams $R^6$, and an upward sliding movement is given to the said parts at the end of the return stroke by the action of the springs $F^8$. During the forward swinging movement of the lay F the dents F' engage the threads a, b, b' to beat up the wefts c, and during the downward movement the dents F' pass out of engagement with the threads a, b, b' and c and the lay F remains in this position to the end of the return stroke, after which the dent bar $F^2$ is caused to rise to reëngage the dents F' with the threads a, b, b', as hereinafter more fully described.

The breast beam G (see Figs. 15, 16, 17 and 18), consists of a supporting bar G' attached to the main frame B, and the top of the bar G' is provided with a row of spaced plates $G^2$ inclined upwardly and rearwardly and projecting beyond the rear face of the supporting bar G', so that the dents F' of the lay F can pass between the rear ends of the plates $G^2$. The upper faces of the rear ends of the plates $G^2$ extend approximately horizontally but are provided with grooves $G^3$ (see Figs. 16 and 17) for the passage of the warp threads a adapted to be clamped in the said grooves $G^3$ by a clamping device S formed of plates S' attached to a cross bar $S^2$ provided with arms $S^3$ fulcrumed on a shaft $S^4$ journaled on the main frame B. The arms $S^3$ are provided with rearwardly extending integral cams $S^5$ pressed on by springs $S^6$ attached to the supporting bar G' of the breast beam G. The springs $S^6$ impart a downward swinging motion to the clamping device to normally hold the clamping plates S' in clamping contact with the warp threads a in the grooves $G^3$ of the breast beam plates $G^2$. The cams $S^5$ are adapted to be engaged by the reed bar $F^2$ of the lay F to swing the clamping device S upward against the tension of the springs $S^6$ so that the clamping plates S' release the warp threads a for the time being, that is, until the weft c is completely beaten up. When the reed bar $F^2$ of the lay F moves downward, the clamping device S is caused to swing downward by the action of its spring $S^6$, so that the clamping plates S' reëngage and clamp the warp threads a in position in the grooves $G^3$ of the breast beam plates $G^2$. A guide roller $S^7$ is loosely journaled on the shaft $S^4$ to engage the top of the fabric e and guide the fabric toward the roller H, as will be readily understood by reference to Fig. 23. The breast beam plates $G^2$ are spaced sufficient distances apart to permit the diagonal threads b, b' to extend on opposite sides of the said plates.

In order to prevent slack in the weft c at the selvages and to insure a proper formation of the selvages, it is desirable to open the shed at the sides, and for this purpose use is made of shed openers T arranged on opposite sides of the loom in the rear of the breast beam G (see Figs. 3, 19, 20, 21 and 22). The shed openers are alike in construction and each consists of a vertically disposed stud T', attached at its lower end to a rearwardly extending bracket $G^4$ forming part of the supporting bar G' of the breast beam G. On the stud T' is mounted to turn the hub T² carrying a shed opener swing arm T³ extending horizontally and adapted to pass between the warp threads a and the diagonal threads b, b' at the sides of the weave.

The upper end of the hub T² terminates in a cam face T⁴ engaging a corresponding cam face T⁵ on the underside of the head T⁶ of the stud T', and the under side of the hub T² is pressed on by a spring T⁷ to hold the cam face T⁴ in contact with the cam face T⁵. An arm T⁸ extends outwardly from the hub T² and is connected by a link T⁹ with a picker stick E³ on the corresponding side of the loom, to impart a swinging motion to the said arm T⁸, with a view to turn the hub T². When the hub T² is turned in one direction the shed opener T³ swings inward between the outermost warp threads a and diagonal threads b, b' to open the shed, so that the shuttle draws the weft c taut to form a proper selvage, and when the hub T² is turned in the opposite direction the selvage opener T³ swings outward into a rearmost position and out of engagement with the threads a and b and b', as shown in Fig. 3.

Although I have shown the shed openers as being actuated from the picker sticks E³ of the shuttle mechanism it is understood that I do not limit myself to such construction especially as the said shed openers may be actuated by separate mechanism driven from the main shaft L.

The warp beam A is provided with the usual brake A² to prevent the warp threads a from too rapidly unwinding and to hold the warp threads taut.

Figure 25:
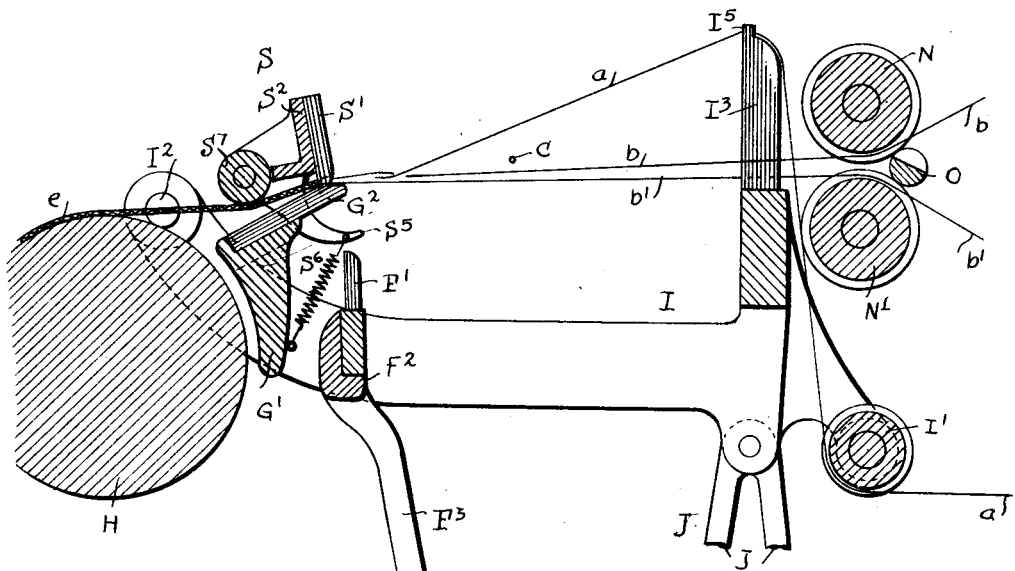
Figure 26:
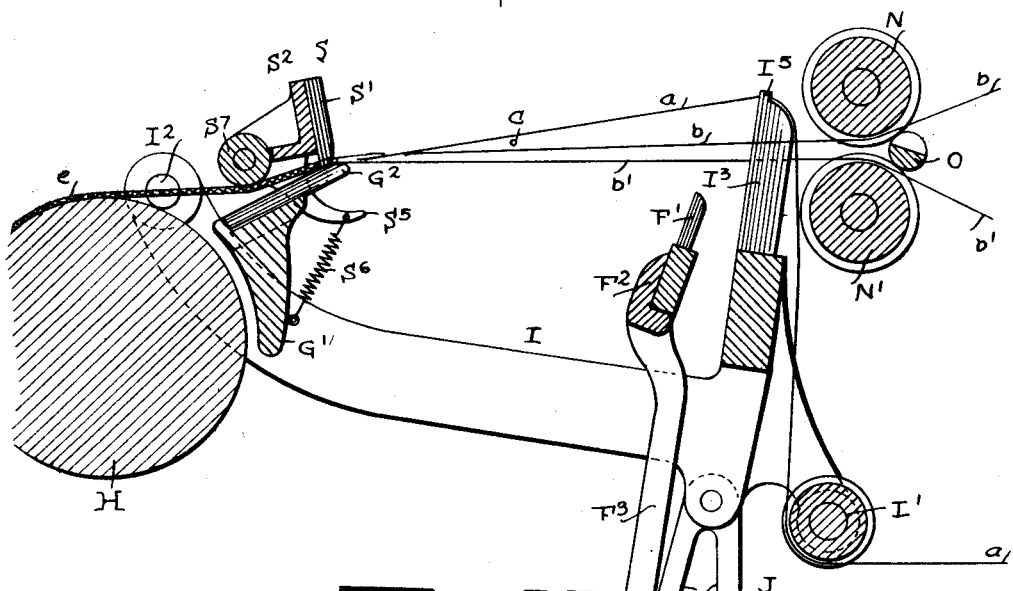
Figure 27:
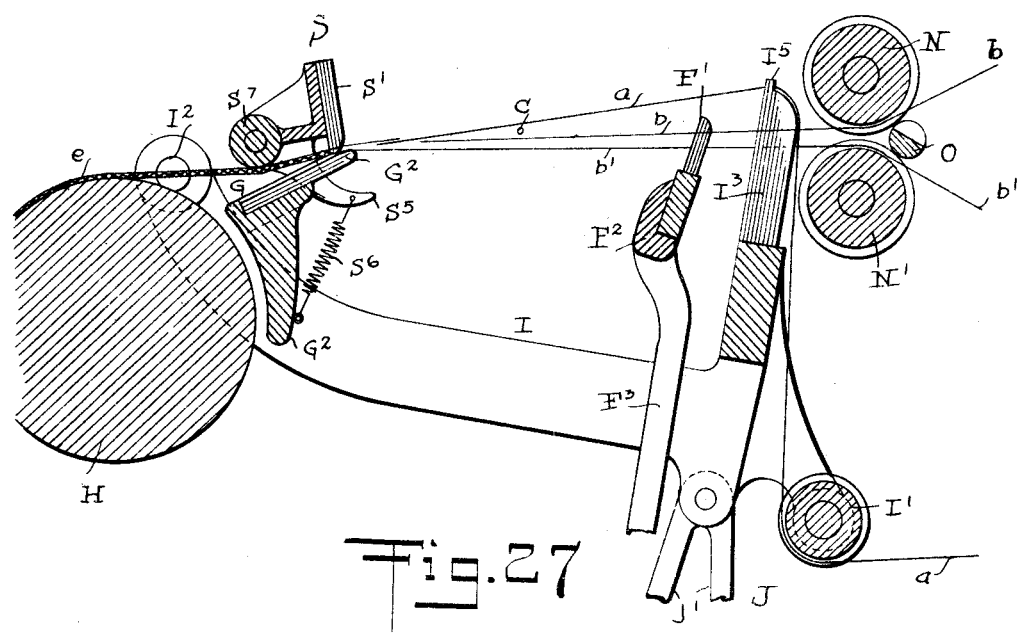
Figure 28:
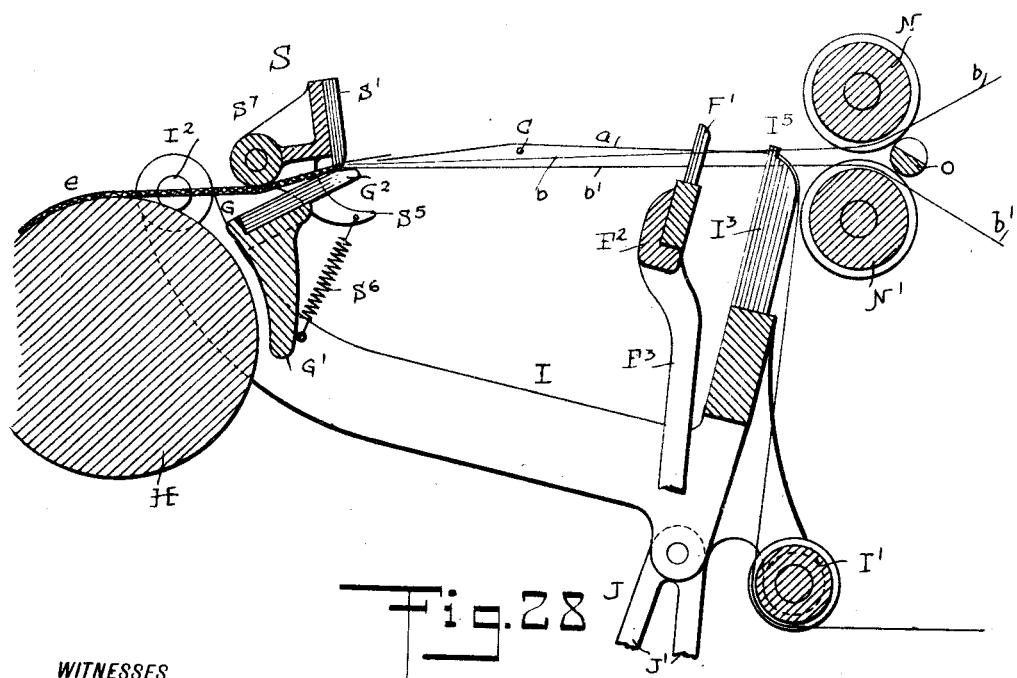
Figure 29:
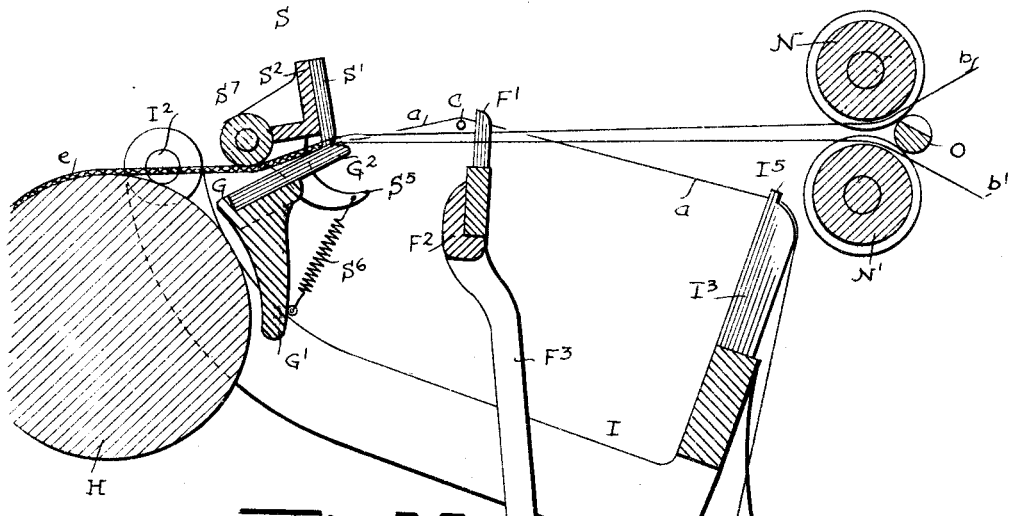

The operation is as follows: When the loom is running and the several parts are in the position shown in Figs. 23 and 24, then the lay F is on the end of its forward stroke having beaten in the weft c. The needle frame I is in its uppermost position, so that the shed is open with the warp threads a above pairs of diagonal threads b, b', crossed in the rear of the lay by a previous turning of the rollers N, N'. Each warp thread a is held between adjacent diagonal threads b, b' extending on opposite sides of the needle I³ carrying this warp thread a. The lay F now moves downward (see Fig. 25) to disengage the dents F' from the threads a, b, b' and c and allow the clamping plates S' of the clamping device S to engage the warp threads a on top of the plates G² of the breast beam G, to clamp the said threads a in place immediately in the rear of the fabric a. During the time the lay has moved down and the needle frame I is in the uppermost position, the shed is held open so that the shuttle E' can pass through the open shed to insert the weft thread c between the warp threads a and the diagonal threads b, b', as indicated in Fig. 25, and during the return swinging movement of the lay F the needle frame I begins to swing downward (see Fig. 26), and the lay F finally rises at the end of the rearward stroke to reëngage the dents F' with the diagonal threads b, b' in the rear of their crossings (see Fig. 27), and the warp threads a are drawn down between the reeds F' on the further downward movement of the needle frame I (see Fig. 28), which latter swings finally below the diagonal threads b, b' while the lay F swings forward and beats up the inserted weft thread c (see Fig. 29). The rollers N, N' are now rotated to cross the pairs of diagonal threads in the rear of the lay F, and then the needle frame I swings upward so that its needles I³ pass between the crossed threads b, b' in the rear of the crossing, as indicated in Fig. 31. In the meantime the lay F has beaten up the weft thread c and the several parts assume again the position shown in Fig. 23, and the above-described operation is repeated.

It is understood that when the lay rises at the end of its rearward stroke and reëngages the diagonal threads b, b' each dent F' passes between a pair of adjacent threads b, b' in the rear of the crossing between these two threads and previously produced by the rotation of the rollers N, N'.

It is understood that each warp thread a is interwoven at each pick with a pair of diagonal threads b, b', but each warp thread a is interwoven in successive picks with different pairs of diagonal threads b, b'. Thus the warp thread a interwoven in one pick with a pair of diagonal threads b, b' is interwoven at the next pick with a pair of diagonal threads b, b' which were next to the first pair of diagonal threads during the first pick.

It is understood that as the threads b, b' are shifted intermittently in a lateral direction by the grooved rollers N, N' and in such a manner that the threads c move from the left to the right and the threads b' from the right to the left; the crossing of two threads b and b' in the rear of the needle I³ is with different threads b, b' after each pick, that is, the threads b and b' are interwoven diagonally in the fabric as they are continually advanced from one side to the other, that is, the thread b advances from the left to the right while the thread b' is advanced from the right to the left.

It is further understood that for each pick the thread b, which reaches the right-hand end of the roller N, is transferred to the right-hand end of the lower roller N', to be then carried by the latter from the right to the left, and at each pick the thread b', which reaches the left-hand end of the roller N' is transferred to the corresponding end of the roller N, to be then moved by the latter gradually from the left to the right.

As previously stated, the revoluble reel D is rotated at such a speed relative to the intermittent rotation given to the rollers N, N' that the above-described result is produced, that is, the reel D revolves synchronously relative to the intermittent rotary motion of the rollers N, N', the reel D and the rollers N, N' coacting to shift the outermost thread b or b' from one roller to the other at the time an upper thread b passes from the upper half of the reel D into the lower half of the reel to become a lower thread b', and a lower thread b' passes from the lower half of the reel D into the upper half of the reel to become an upper thread b. The spool frames C² are mounted to turn on the reel D so that the threads b or b' unwinding in series from a spool have all the same tension between the spool and the corresponding roller N or N'. By arranging the fulcrum of the needle frame I at the front end of the main frame B and locating the guide roller A' at the rear of the guide roller I', the warp threads a are not slackened on the up and down swinging movement given to the needle frame. The cloth beam H² winds up the woven fabric in the usual manner.

In the arrangement shown in the drawing two diagonal threads b, b' are interwoven at each pick, with one warp thread a and the diagonal threads b, b' range from one selvage d to the other selvage d' and then back to the selvage d so that the diagonal threads extend zigzag fashion in the fabric. It is evident that I do not limit myself to this particular arrangement as the same may be varied without deviating from my invention, the essential feature of which is the means for weaving a thread diagonally into the fabric.

Having thus described my invention, I claim as new and desire to secure by Letters Patent:

1. A loom for producing a fabric having diagonally ranging threads, comprising means for advancing and shifting the reinforcing threads laterally to cross and dispose them diagonally, vertically reciprocating means for carrying the warp threads between and above and below the reinforcing threads, means for inserting the weft threads between the reinforcing and warp threads, and beating up means for the weft threads, the operation of the several parts being so timed with respect to one another that the reinforcing threads will be crossed above the warp threads and below the weft threads.

2. A loom for producing a fabric having diagonally ranging threads, comprising means for advancing and shifting the reinforcing threads laterally to cross and dispose them diagonally, vertically reciprocating needles carrying the warp threads and between which the reinforcing threads pass whereby the warp threads will be carried between the reinforcing threads and above and below the same, means for inserting the weft threads between the warp and reinforcing threads and above the latter, and a lay having a swinging and up and down movement for beating up the weft threads.

3. A loom for producing a fabric having diagonally ranging threads, comprising means for advancing and shifting the reinforcing threads laterally to cross and dispose them diagonally, vertically reciprocating means for carrying the warp threads between the reinforcing threads and above and below said threads, means for inserting the weft threads between the warp and reinforcing threads and above the latter, a lay, and means for clamping the warp threads periodically in place and controlled by the lay.

4. A loom for producing a fabric having diagonally ranging threads, comprising means for advancing and shifting the reinforcing threads laterally to cross and dispose them diagonally, vertically reciprocating means for carrying the warp threads between and below and above the reinforcing threads, means for inserting the weft threads between the warp and reinforcing threads and above the latter, means for periodically clamping the warp threads in place, a beating up device for the weft threads, and controlling the clamping means, and means for opening the shed at opposite sides.

5. In a loom for producing a fabric having diagonally ranging threads, means for advancing and shifting the reinforcing threads laterally to cross and dispose them diagonally, a needle frame having needles carrying the warp threads between the reinforcing threads and above and below the same, a crank shaft, means connecting the needle frame with the crank shaft, whereby the needle frame is held at rest when in an uppermost position during each revolution of the crank shaft, and a lay having a swinging and up and down movement.

6. In a loom for producing a fabric having diagonally ranging threads, means for advancing and shifting the reinforcing threads laterally to cross and dispose them diagonally, a needle frame having needles carrying the warp threads between the reinforcing threads and above and below the same, a stop against which the needle frame is adapted to abut, a crank shaft, and a sectional and yielding link having one member secured to the needle frame, and the other to the crank shaft.

7. In a loom for producing a fabric having diagonally ranging reinforcing threads, means for advancing and shifting the reinforcing threads laterally to cross and dispose them diagonally, vertically reciprocating means for carrying the warp threads above and below the reinforcing threads, a shuttle mechanism, and a shed opener, one at each side of the loom and having an arm adapted to swing between the warp threads and the diagonal threads to permit the shuttle to draw the weft threads taut and thereby form a proper selvage.

8. In a loom for producing a fabric having diagonally ranging reinforcing threads, means for advancing and shifting the reinforcing threads laterally to cross and dispose them diagonally, vertically reciprocating means for carrying the warp threads above and below the reinforcing threads, a shuttle mechanism, a shed opened at each side of the loom and having an arm adapted to swing between the warp threads and the diagonal threads, and means for operating the shed openers from the shuttle mechanism.

9. In a loom for producing a fabric having diagonally ranging reinforcing threads, means for advancing and shifting the reinforcing threads laterally to cross and dispose them diagonally, vertically reciprocating means for carrying the warp threads above and below the reinforcing threads, a shed opened at each side of the loom, consisting of a stud provided with a head having a cam face, a hub on the stud having a cam at its upper end engaging the cam of the head of the stud and provided with an arm, a spring on the stud and pressing the hub in engagement with the head of the stud, and means for operating the hub to swing its arm between the warp and diagonal threads.

10. A loom for interweaving warp threads, weft threads and diagonal threads, comprising a revoluble reel carrying spools from which unwind the diagonal threads in series, a pair of threaded rollers arranged adjacent to each other, the diagonal threads passing over one roller and under the other one of the rollers shifting its diagonal threads in one direction and the other roller shifting its diagonal threads in the opposite direction, a needle frame having up and down movement and carrying the warp threads between the reinforcing threads and above and below the same, a lay, and a shuttle mechanism for insertion of the wefts.

11. A loom for interweaving warp threads, weft threads and diagonal threads, comprising a revoluble reel carrying spools from which unwind the diagonal threads in series, a pair of threaded rollers engaging the said diagonal threads, one of the rollers shifting the diagonal threads in one direction and the other roller shifting its diagonal threads in the opposite direction, a needle frame having an up and down motion and provided with needles having eyes for the passage of the warp threads whereby the warp threads will be carried between the reinforcing threads, a lay having a reciprocating and an up and down motion, and a shuttle mechanism for insertion of the wefts.

12. A loom for interweaving sets of diagonal threads extending diagonally in opposite directions, having a pair of rollers arranged adjacent to each other and having screw threads extending in the same direction, for guiding the sets of diagonal threads in the direction of the length of the rollers, the diagonal threads passing over one roller and under the other, and means for rotating the said rollers in unison and in opposite directions.

13. A loom for interweaving diagonal threads with warp threads and weft threads, comprising a revoluble reel carrying a plurality of spools from which unwind the diagonal threads, a pair of threaded rollers revolving intermittently and in unison, the diagonal threads passing over one roller and under the other and engaged by the threads of said rollers to shift the threads gradually in the direction of the length of the rollers, a reciprocating needle frame having needles carrying the warp threads between the diagonal threads and above and below the same, a shuttle mechanism for the weft, and a lay having a swinging and up and down movement.

14. A loom for interweaving diagonal threads with warp threads and weft threads, comprising a revoluble reel carrying a plurality of spools from which unwind the diagonal threads, a pair of threaded rollers revolving intermittently and in unison, the diagonal threads being engaged by the threads on the rollers to shift the diagonal threads gradually in the direction of the length of the rollers, a reciprocating needle frame having needles for the passage of the warp threads, a shuttle mechanism for the weft, a lay having a swinging and an up and down movement, a breast beam, and a clamping device coacting with the said breast beam to clamp the warp threads periodically in place.

15. A loom for interweaving diagonal threads with warp threads and weft threads, comprising a revoluble reel carrying a plurality of spools from which unwind the diagonal threads, a pair of threaded rollers revolving intermittently and in unison, the diagonal threads being engaged by the threads on the rollers to shift the diagonal threads gradually in the direction of the length of the rollers, a reciprocating needle frame having needles for the passage of the warp threads, a shuttle mechanism for the weft, a lay having a swinging and an up and down movement, a breast beam having spaced plates for the passage of the warp threads, and a clamping device for clamping the warp threads periodically in position on the said plates.

16. A loom for interweaving diagonal threads with warp threads and weft threads, comprising a revoluble reel carrying a plurality of spools from which unwind the diagonal threads, a pair of threaded rollers revolving intermittently and in unison, the diagonal threads being engaged by the threads on the rollers to shift the diagonal threads gradually in the direction of the length of the rollers, a reciprocating needle frame having needles for the passage of the warp threads, a shuttle mechanism for the weft, a lay having a swinging and an up and down movement, a breast beam having spaced plates for the passage of the warp threads, and a clamping device for clamping the warp threads periodically in position on the said plates, the said clamping device being controlled by the lay.

17. A loom for interweaving diagonal threads with warp threads and weft threads, comprising a revoluble reel carrying a plurality of spools from which unwind the diagonal threads, a pair of threaded rollers revolving intermittently and in unison, the diagonal threads being engaged by the threads on the rollers to shift the diagonal threads gradually in the direction of the length of the rollers and in juxtaposition with each other, a needle frame having an intermittent swinging motion and provided with needles having eyes for the passage of the warp threads, the diagonal threads passing on opposite sides of the needle, and means for the introduction of the wefts into the weave.

18. A loom provided with a breast beam having spaced plates provided with grooves for the passage of the warp threads, a clamping device mounted to swing and having clamping plates for clamping the warp threads temporarily in position on the said breast beam plates, and a lay for beating in the weft and controlling the said clamping device.

19. A loom provided with a breast beam having spaced plates provided with grooves for the passage of the warp threads, a clamping device mounted to swing and having clamping plates for clamping the warp threads temporarily in position on the said breast beam plates, a spring pressing the said clamping device, and a lay adapted to engage the said clamping device and to swing the same out of clamping position.

20. A loom for interweaving sets of diagonal threads extending diagonally in opposite directions, having a pair of rollers rotating in unison and having screw threads for guiding the said sets of diagonal threads in the direction of the length of the rollers, said rollers being adjacent to each other, and a guide rod extending between the sets of diagonal threads adjacent to the said rollers.

21. A loom for interweaving sets of diagonal threads extending diagonally in opposite directions, having a pair of rollers rotating in unison and having screw threads for guiding the said sets of diagonal threads in the direction of the length of the rollers, said rollers being adjacent to each other, and a guide rod extending between the sets of diagonal threads adjacent to the said rollers, the said guide rods being arranged parallel to the said rollers and terminating at its ends at the ends of the threads on the rollers.

22. A loom for interweaving sets of diagonal threads in the weave, having a revoluble reel carring a plurality of spools from each of which unwinds a series of diagonal threads, a pair of rollers arranged adjacent to each other and having screw threads for the passage of the diagonal threads unwinding from the said spools, a guide rod extending between the sets of diagonal threads adjacent the said rollers, the said guide rod being arranged parallel to the said rollers between the latter and the said reel, the guide rod terminating at the ends of the threads on the said rollers, and a guide plate adjacent to one end of the said guide rod.

23. A loom provided with a revoluble reel having a circular thread guide, a series of spool frames mounted to swing on the said reel and having their axes disposed radially on the reel, and a spool journaled in each spool frame and having its axis extending tangentially relative to the reel, the threads unwinding from the spool passing through the said thread guide.

24. A loom provided with a revoluble reel having a circular thread guide, a series of spool frames mounted to swing on the said reel and having their axes disposed radially on the reel, a spool journaled in each spool frame and having its axis extending tangentially relative to the reel, the threads unwinding from the spool passing through the said thread guide, and a tension device for each spool.

25. In a loom a reel having a rim provided with a plurality of slots and a hub having a socket, and a series of spool frames each having radially disposed journals, one engaging a slot in the rim of the reel and the other provided with an enlargement engaging the socket of the hub of the reel.

26. A loom for interweaving diagonal threads with warp threads and weft threads, comprising a revoluble reel carrying a plurality of spools from which unwind the diagonal threads, a pair of threaded rollers revolving intermittently and in unison, the diagonal threads being engaged by the threads on the rollers to shift the diagonal threads gradually in the direction of the length of the rollers, a reciprocating needle frame having needles for the passage of the warp threads, a shuttle mechanism for the weft, a lay made in sections, of which one is mounted to slide on the other, means for imparting a rocking motion to the lay, and means for imparting a sliding motion to the said slidable lay section.

In testimony whereof I have signed my name to this specification in the presence of two subscribing witnesses.

WILLIAM GEORGE TRAUTVETTER.

Witnesses:
 THEO. G. HOSTER,
 PHILIP D. ROLLHAUS.